Ronald H. Johnson
Carlton F. Miller
Frederick G. Parsons
Inventors
by Alfred H. Rosen
Attorneys Ronald H. Johnson
Carlton F. Miller
Frederick G. Parsons
Inventors
by Alfred H. Rosen
Attorneys July 14, 1970 R. H. JOHNSON ET AL 3,520,624

MICRODENSITOMETRIC APPARATUS FOR SIMULTANEOUSLY EXAMINING A PLURALITY OF RECORD IMAGE AREAS

Filed May 10, 1966 3 Sheets-Sheet 3

Ronald H. Johnson
Carlton S. Miller
Frederick G. Parsons
Inventors
by Alfred H. Rosen
Attorneys

United States Patent Office 3,520,624

Patented July 14, 1970

3,520,624

MICRODENSITOMETRIC APPARATUS FOR SIMULTANEOUSLY EXAMINING A PLURALITY OF RECORD IMAGE AREAS

Ronald H. Johnson, Westford, and Carlton S. Miller, Bedford, Mass., and Frederick G. Parsons, Providence, R.I., assignors to Technical Operations, Incorporated, Burlington, Mass., a corporation of Delaware Filed May 10, 1966, Ser. No. 549,031

Int. Cl. G01n *21/06, 21/22;* G01j *1/42*

U.S. Cl. 356—203 6 Claims

ABSTRACT OF THE DISCLOSURE

This disclosure depicts microdensitometric apparatus for simultaneously examining image points on one or more photographic records to produce two signals which are useful individually or which may be processed together to yield optical functions such as transmission, density, density slope, and the like.

In photometry a photo detecting device with respect to a recorded image "sees" transmittance or reflectance depending on whether illumination is transmitted through or reflected from the image. A basic characteristic of the image is its optical density. Transmittance or reflectance are the ratio of incident light to transmitted light in the former and to reflected light in the latter. Optical density is the logarithm to base 10 of the reciprocal of optical transmittance.

Various densitometers are available commercially to provide a direct indication of density. Some of these are recording microdensitometers which record a graphical representation of optical density variations across an image. The density recording enhances variations of low spatial frequencies which the human eye fails to notice. These low frequency density variations introduce a problem in that variations in intensity of the background or the illumination, and variations in intensity introduced by natural imperfections of the optical equipment (such as vignetting by lenses or formation of rasters by scanning reproduction systems) are emphasized on the recording so as to frequently obscure desired detail.

Now in accordance with the present invention we have found means for deriving various functions of the density, transmittance or reflectance of an image such as slope and vector gradient, and functions relative to two images such as differences, summations, products or quotients wherein one of the two images, for example, can serve the function of a corrective mask, and various related functions.

In one embodiment density slope is achieved by subtracting or adding the output drive systems of two recording microdensitometers. In a second embodiment this is achieved by splitting light from the specimen image into two beams modulated by adjacent discrete areas of the specimen and moving a linear density wedge in at least one of said beams by a servo loop driven to a null by the amplified difference in the detected intensity of said beams. Thus it is an object of the invention to define means for deriving density slope in a recorded image.

It is a further object of the invention to define novel means for deriving functions related to density in images stored in photostorage materials.

It is a further object of the invention to define means for adding and subtracting the output density signals, i.e. multiplying and dividing transmissions, of two microdensitometers.

It is a further object of the invention to define means for deriving density slope in a recorded image using a single light source and a single photo detector.

It is a further object of the invention to define means for deriving density gradient in a recorded image equal to the square root of the sum of the squared density slopes in two orthogonal directions, i.e. the magnitude of the vector quantity called the gradient.

Further objects and features of the present invention will become apparent upon reading the following specification together with the drawings in which.

Figure 1:
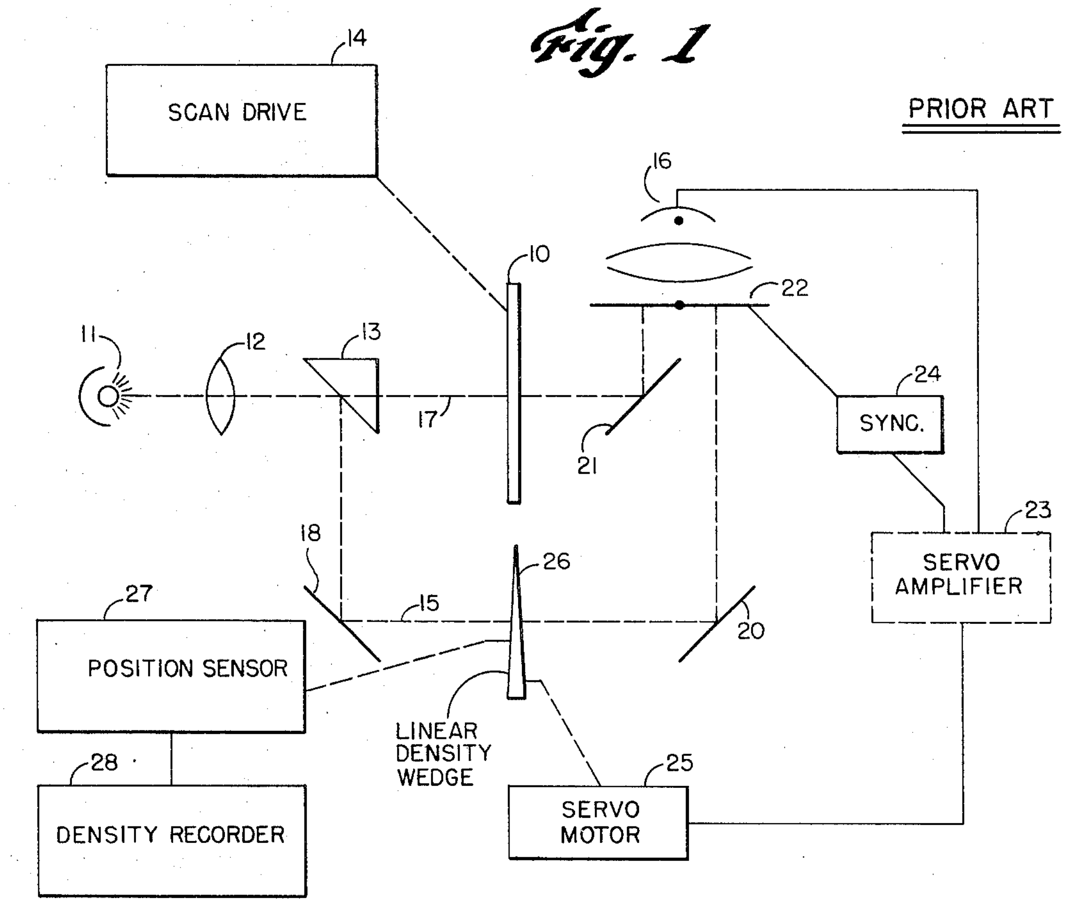
FIG. 1 is a diagramatic illustration of a prior art microdensitometer.

FIG. 1 is a diagramatic illustration of a prior art microdensitometer. The microdensitometer of FIG. 1 is described in further detail in U.S. patent application Ser. No. 372,239 filed June 3, 1964, now Pat. No. 3,424,534. Other types of prior art microdensitometers and microphotometers can also be equally well applied to the present invention. For purposes of the present invention, FIG. 1 will be described briefly with specific relation to function. A specimen such as photographic transparency 10 is placed in the examination plane of the microdensitometer and illuminated by light from source 11. The light is formed into a beam by lens 12 and split by prismatic beam splitter 13 so that a portion of the beam is deflected along secondary path 15 to serve as a "comparison beam." The undefiected portion of the beam serves as the specimen beam illuminating specimen 10. Both the comparison beam and the specimen beam are sensed by photo detector 16.

The specimen beam directed along a primary path 17 and the comparison beam directed along secondary path 15 are brought together at photo detector 16. By way of example, mirrors 18, 20 and 21 may be used to direct the beams along their respective paths so that they come together at photo detector 16.

"Chopper" 22 is used to give a time separation between sensing of the two beams by photo detector 16. Chopper 22 can be a simple motor driven "disc" or "fan" having apertures which alternately pass the two beams to photo detector 16. The output of photo detector 16 is then the same for both beams when their levels are equivalent. But when the intensity of the two beams is different, the output of photo detector 16 alternates at the chopper frequency. Phoo detector 16 detects light intensity which is directly proportional to transmission in the case of a transparent image and to reflection in the case of an opaque image.

The photo detector output is amplified by amplifier 23. Amplifier 23 is part of a servo system and drives a servo motor 25. The phasing of chopper 22 is synchronized with the servo system so that motor 25 is controlled in direction by phase information indicative of the more intense one of the two beams relative to the other. The synchronizing function is depicted in FIG. 1 by "sync" block 24 and can be a conventional common sinusoidal reference as used in servo systems. Servo motor 25 is connected to drive linear density wedge 26 back and forth in the path of the comparison beam.

Wedge 26 varies from nearly opaque at one end to substantially transparent at the other. The variance in transmission characteristics from one end to the other is generally made with a linear density variation, however other functions are used for specific purposes. The wedge can be made of a glass plate coated with a photographic emulsion. Exposing the emulsion with appropriate exposure variations and developing produces the desired density wedge.

Wedge 26 is moved by motor 25 until the comparison beam matches the intensity of the specimen beam as seen by photo detector 16. Movement of wedge 26 in the direction of increasing density will decrease the intensity of the comparison beam while moving it in the opposite direction will increase intensity. When the density of the illuminated area of the specimen matches the density of the illuminated area of the wedge the servo system reaches a null until the specimen is illuminated in an area of different density. Density is recorded by sensing the position of wedge 26 by position sensing means 27 and driving a density recorder 28 so as to produce a graphic representation directly related to the position of wedge 26. Specimen 10 is scanned by means of scan drive 14 effecting relative motion between specimen 10 and light along path 17.

The servo system including the chopper, photo detector and density wedge, is an example of what is hereinafter described as a "logarithmic transmission comparator." The photo detector actually detects in accordance with transmission characteristics and thus compares transmission of the specimen and the wedge. However it is often desired to read out $$\text{density} = \text{Log}_{10}\frac{1}{\text{Transmission}}$$

By obtaining readout from the physical position of the linear density wedge, direct density information is obtained.

Figure 3:
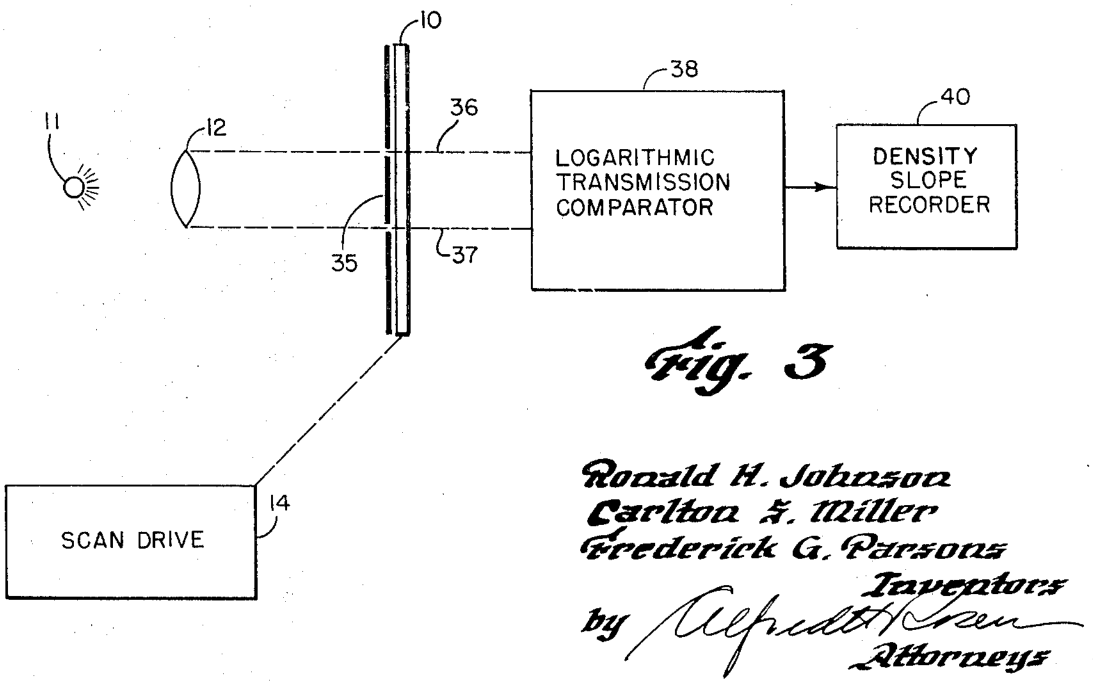
FIG. 3 is a block diagram of a density slope recorder according to the invention.
Figure 2:
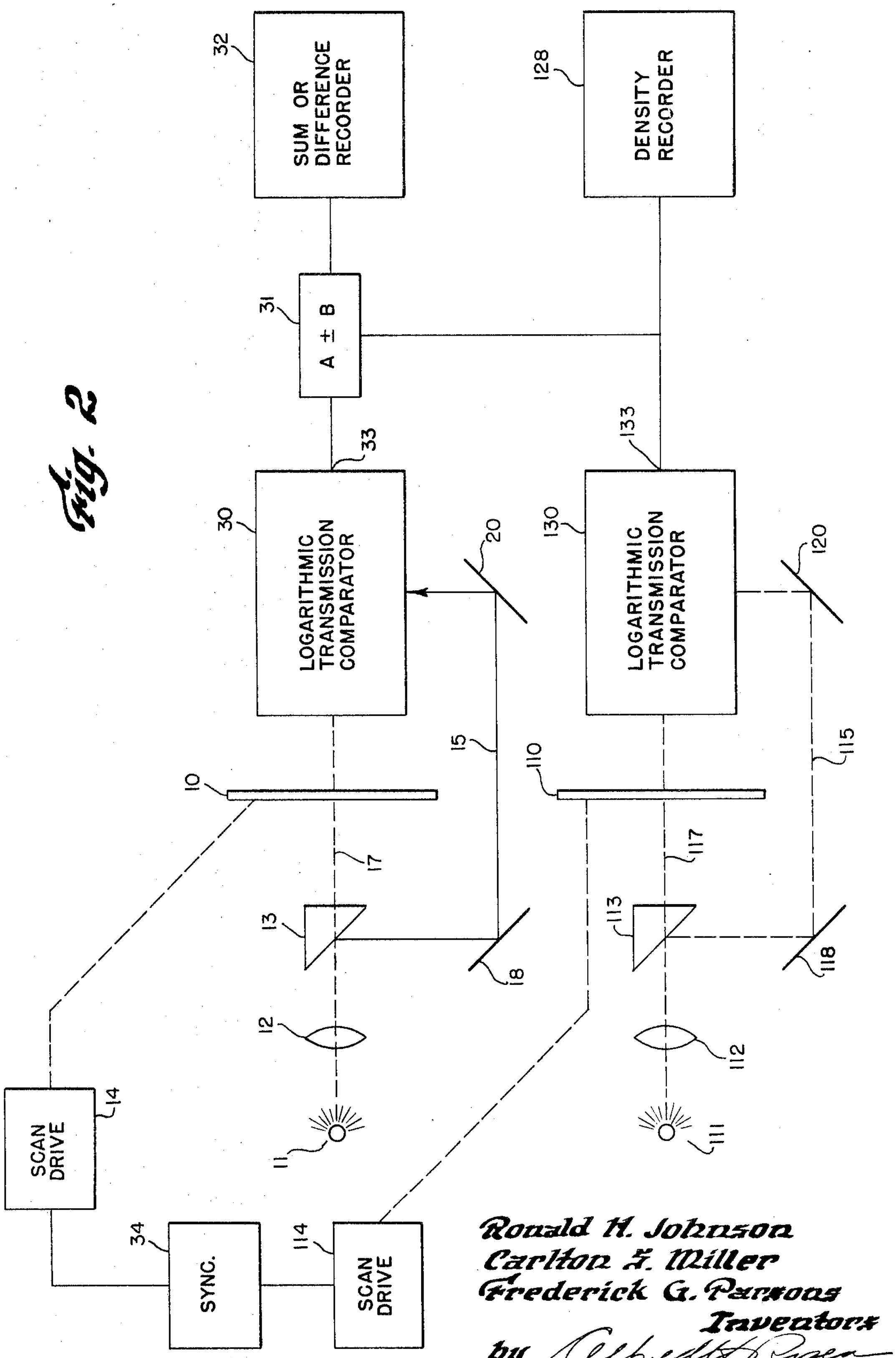
FIG. 2 is a block diagram of two microdensitometers with their outputs combined to provide sum or difference density recording.
Figure 4:
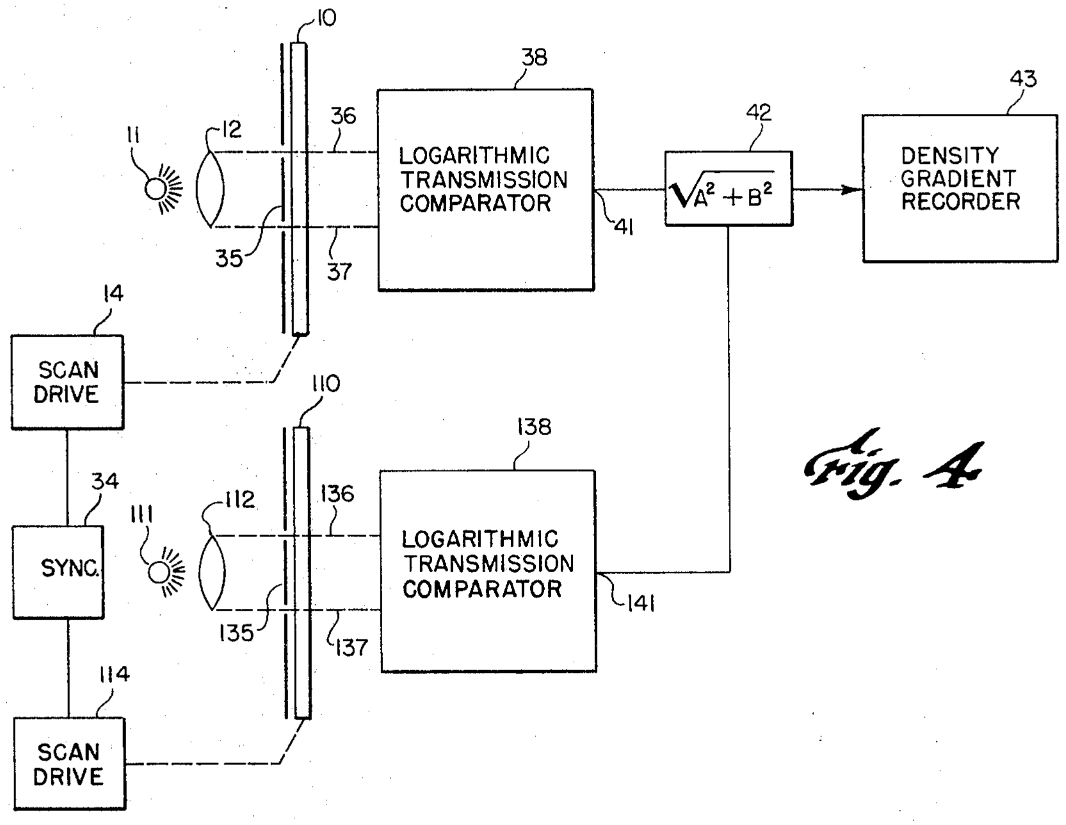
FIG. 4 is a block diagram of two density slope recorders with their output signals combined to give square root of sum-of-the-squares information; and, FIG. 5 is a partial schematic of means for obtaining the square root of the sum-of-the-squares in FIG. 4.

In FIGS. 2 through 4 the servo system of FIG. 1 is merely designated by a block labeled "Logarithmic Transmission Comparator."

FIG. 2 depicts one embodiment of the invention in which two microdensitometers are combined to give sum or difference information.

The reference designations used in FIG. 2 are the same for like parts as used in FIG. 1. However, the reference designations in the second microdensitometer of the pair illustrated in FIG. 2 have 100 added to each of the reference designations for purposes of distinction.

The output of the first microdensitometer is seen at output 33 of logarithmic transmission comparator 30 and represents the density of specimen 10. The output of the second microdensitometer is seen as termnial 133 at the output of logarithmic transmission comparator 130. The output of logarithmic transmission comparator 130 is connected to a density recorder 128 and also to arithmetic block 31 which also has an input from logarithmic transmission comparator 30. Arithmetic block 31 comprises means for determining the sum or difference of the density outputs from the two microdensitometers and is connected to a recorder 32 for recording such sum or difference. In terms of transmissions this would be a product or quotient.

One way in which arithmetic block 31 can operate is with a system in which the position of wedges, such as density wedge 26 of FIG. 1, is indicated by a voltage. For example, the wedge can have an electrical contact or brush that moves with the wedge and rides along the contacts of a voltage divider or the like to pick off different voltages related to the position of the wedge. Arithmetic block 31 can then add or subtract such voltages by conventional electronic circuits utilized for this purpose. It will be recognized that both electromechanical and straight electronic means can be used.

Scan drives 14 and 114 providing relative scanning motion between specimens 10 and 110 and beam paths 17 and 117 respectively are connected by synchronizing means 34 to operate in synchronism.

Recorder 32 is suitably and essentially identical to recorder 128 but with a modified input as indicated. If specimens 10 and 110 are identical and displaced only slightly relative to each other in their respective beam paths, then a subtraction of the output of comparator 30 from the output of comparator 130 will give the slope between the two points being illuminated. Thus when specimens 10 and 110 are moved synchronously but slightly out of phase across the paths of the respective beams 17 and 117 a continuous recording of density slope will be obtained from recorder 32. A regular density recording can be obtained at the same time from recorder 128.

The apparatus in FIG. 2 can also serve to correct for vignetting (a low spatial frequency density modulation introduced by the loss in relative aperture of a camera lens away from the objective axis). This can be done by exposing film similar to the film used for specimen 110 through the same lens used in making specimen 110 but with uniform illumination. The specimen obtained in this way can be used as a vignetting corrector for specimen 110 when placed in the position of specimen 10 of FIG. 2 and with the density output of comparator 30 subtracted from the density output of comparator 130. This correction can be made either by addition or subtraction in block 31 depending on the relative positive/negative characteristics of the image specimen and the correction specimen.

When using the apparatus of FIG. 2 for vignetting correction as described above, density recorder 128 will give an uncorrected recording and recorder 32 will provide the corrected recording. The apparatus of FIG. 2 can also be used for various other corrective and modifying processes such as frequently performed by masking. Raster removal and arbitrary correction for intensity or density such as caused by nonuniform illumination, nonuniform additive, or attenuating background are exemplary.

In order to read density slope it is only necessary to compare density of two neighboring areas of a specimen. These areas may be contiguous, overlapping or separate nearby areas. Thus if a second beam passes through the specimen and is directed in close proximity to the original specimen beam it should be possbile to get density slope information without the need of combining two individual density recording machines. FIG. 3 depicts this arrangement using again light source 11 and collimating lens 12 but then, instead of beam splitting, merely directing the beam through a mask 35 which separates the beam into two components which may be then considered two secondary beams 36 and 37. The position of the mask relative to specimen 10 is not critical as long as it divides the beam in such a way that when secondary beam 36 is detected as by a photo detector 16 (see FIG. 1) it is representative substantially only of light passing through a first discrete area of specimen 10. Likewise when secondary beam 37 is sensed as by photo detector 16 it should be representative substantially only of light passing through a second discrete area of specimen 10.

Logarithmic transmission comparator 38 can be made in any way that will serve this function and, for example, can be made essentially as described in connection with FIG. 1 using a density wedge in at least one of the two secondary beams 36 and 37. A split wedge can be used to serve both as a density wedge and mask 35. The beam is broken into the two secondary beams by an opaque longitudinal line on the wedge and the halves of the wedge on either side of this line can have density gradients in opposite directions. It has also been found convenient to have a density gradient on only one half of the wedge while leaving the other half transparent or biasing it slightly with some slight amount of uniform neutral density.

Again as in FIG. 1 the servo system will cause the wedge to move until the two secondary beams are matched in density, achieving a null. The position of the wedge will then be indicative of the density slope between the two illuminated discrete areas of the specimen. One of the weaknesses in the information obtained from apparatus in accordance with FIGS. 2 and 3 is that the density slope is only detected along a straight line portion of the specimen. It is frequently much more desirable to read density gradient along two orthogonally related line portions. For example, if the specimen can be looked at in two discrete areas vertically displaced and two discrete areas horizontally displaced both with respect to some single point in the specimen and obtain the resultant of the two slopes a more meaningful output can be obtained. This would avoid the ambiguities produced by skating along the edge of a line. In one embodiment, the present invention achieves this by deriving the square root of the sum-of-the-squares of two orthogonally related slopes. To distinguish from "slope" the resultant thus obtained is herein defined as a density "gradient."

Apparatus for deriving density information in two orthogonally related line portions is depicted in FIG. 4. A first density slope detecting device similar to that depicted in FIG. 3 is illustrated having an output terminal 41, and a second density slope detecting device similar to that in FIG. 3 is illustrated having an output terminal 141. Specimens 10 and 110 are scanned synchronously in the two devices but with the secondary beams 36 and 37 of the first device lined up in a direction with respect to the specimen 10 that is orthogonal with respect to the direction in which secondary beams 136 and 137 are lined up in on specimen 110. Specimens 10 and 110 are identical duplicates.

Referring again to FIG. 1 the orthogonally related directions can be obtained merely by having the density wedge in the first density slope detector device positioned at right angles in the second density slope detecting device. When the two devices scan their respective duplicate specimens synchronously one will then be scanning at two spots horizontally displaced and the other at two spots vertically displaced about a single point on the specimen. The outputs of the two devices from output terminals 41 and 141 are then combined in pythagorean box 42 to obtain the magnitude of the gradient. Pythagorean box 42 merely determines the square root of the sum-of-the-squares of the two outputs. This is then used to drive density gradient recorder 43. The function of Pythagorean box 42 can be performed by many available and conventional mechanical devices and electronic arrangements. One arrangement that can be used when the logarithmic transmission comparator has density wedges of the type described in connection with FIG. 1 is illustrated in FIG. 5.

Figure 5:
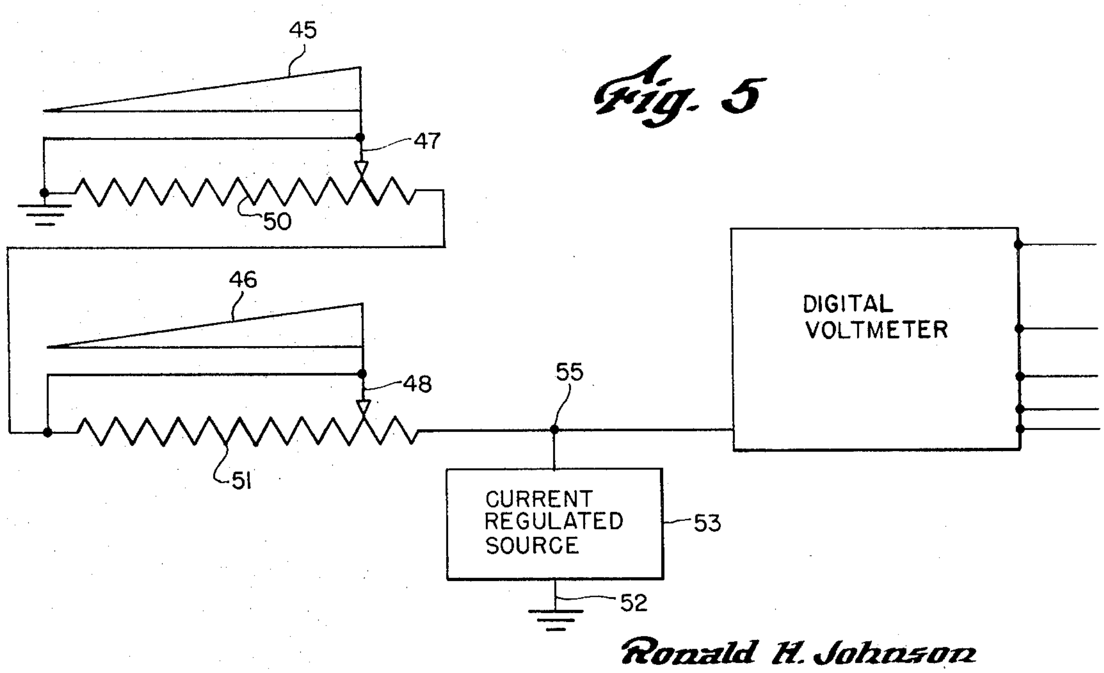

In FIG. 5 density wedge 45 may be considered part of logarithmic transmission comparator 38 of FIG. 4. Likewise density wedge 46 can be part of comparator 138. Wedges 45 and 46 each have a sliding electrical contact or brush 47 connected rigidly to the wedge or to a support or framework of the wedge that moves with the wedge. Thus when wedge 45 is moved by the null seeking servo system, contact 47 moves with the wedge. With the two slope detecting devices connected to operate together a resistive divider network having first resistive portion 50 associated with wedge 45 and a second resistive portion 51 associated with wedge 46 is connected so that resistive portions 50 and 51 are in series. A first end of portion 50 is connected to one terminal 52 of a supply source 53 and the opposite end of portion 51 connected to the opposite polarity terminal 55. Supply source 53, for purposes of this example, has a current limited source that provides the same current flow irrespective of load. Therefore the current flow through the divider resistor will be the same even with portions of the resistor shorted out. Contact 47 is connected to terminal 52 of the supply source so that it short-circuits an amount of resistive portion 50 determined by the position of wedge 45. Likewise contact 48 is directly connected to one end of resistive portion 51 so that it short-circuits a part of resistive portion 51 depending upon the position of wedge 46.

The voltage drop across the nonshort-circuited parts of resistive portions 50 and 51 are additive due to the series connection and will appear as the voltage between terminals 52 and 55. However the voltage that we want to add must represent a sum of squares. This is easily obtained by providing resistive divider portions 50 and 51 with square-law tapers. The respective wedges moving linearly with density variation along a square-law taper votage divider will provide output voltages varying with the square of density. Thus a voltage is obtained between terminals 52 and 55 that is related to the sum-of-the-squares of the two density slopes. Again there are several means by which this can be transposed in accordance with a square root law.

One method that has been found satisfactory for purposes of the present invention is to feed the output seen between terminals 52 and 55 to a digital voltmeter. Those familiar with digital voltmeters will readily understand that the digital voltmeter outputs can readily be tapped to the digital functions of the voltmeter in a square root progression to provide the desired output. In one form of recording density gradient a series of connections can be made at points in the digital register determined by a square root function and each of these taps can be connected to a recording device which will produce a continuous line, a signal appearing on the second tap could produce dashes, a signal appearing on a third tap could produce dots and a signal appearing on a fourth tap could produce dots and dashes. Since there are recorders available that will operate in this fashion and since the recording apparatus is not critical to the invention it is unnecessary to go into the details of an exemplary recorder.

Other algebraic operations can derive for example, the angle of the gradient.

While the invention has been described in relation to specific embodiments, various modifications thereof will be apparent to those skilled in the art and it is intended to cover the invention broadly within the spirit and scope of the appended claims.

What is claimed is:

1. Optical apparatus for deriving optical functions of one or more images in photostorage materials comprising:

(a) two separate detection means for simultaneously and synchronously detecting light intensity as a function of image photometric characteristics in two illuminated stored image areas and to provide distinct electrical signals proportional to the detected light intensity from the respective areas;

(b) means coupled to said two separate detection means and operative to said distinct electrical signals for deriving an output signal that is proportional to the density slope between said examined image areas, comprising means for subtracting the logarithm of the reciprocals of said distinct electrical signals, whereby when said separate stored images are duplicate images scanned synchronously and slightly displaced, said output signal will be proportional to the density slope between said image areas; and (c) means to scan said photostorage materials for deriving a sequence of said output signals through detecting in synchronism successive pairs of stored image areas.

2. Optical apparatus for deriving optical functions of one or more images in photostorage materials comprising:

(a) two separate detection means for simultaneously and synchronously detecting light intensity as a function of image photometric characteristics in two illuminated stored image areas and to provide distinct electrical signals proportional to the detected light intensity from the respective areas;

(b) means coupled to said two separate detection means and operative in response to said distinct electrical signals for deriving an output signal that is a function of the combined photometric characteristics of said stored image areas, comprising means for adding the logarithm of the reciprocals of said distinct electrical signals, whereby when one of said separate stored images is a corrective image for undesired variations appearing in the other image and said images are scanned synchronously and in phase, said output signal will be proportional to the corrected density of said other image; and (c) means to scan said photostorage materials for deriving a sequence of said output signals through detecting in synchronism successive pairs of stored image areas.

3. Optical apparatus for deriving optical functions of one or more images in photostorage materials comprising:

(a) means for simultaneously and sequentially detecting light intensity as a function of image photometric characteristics in a plurality of illuminated stored image areas and provide distinct electrical signals proportional to the detected light intensity from the respective areas, said means for detecting comprising at least one detection means operative to sense light from two neighboring discrete stored image areas of the same image and provide said distinct electrical signals;

(b) means coupled to said means for simultaneously and sequentially detecting operative in response to said distinct electrical signals for deriving an output signal that is a function of the combined photometric characteristics of said stored image areas, said means operative in response to said signals comprising means for comparing the logarithm of the reciprocals of said signals so as to derive an output signal proportional to the density slope between said neighboring discrete stored image areas; and (c) means to scan said photostorage materials for deriving a sequence of said output signals through detecting successive pluralities of stored image areas.

4. Optical apparatus for deriving optical functions of one or more images in photostorage materials comprising:

(a) means for simultaneously and sequentially detecting light intensity as a function of image photometric characteristics in a plurality of illuminated stored image areas and provide distinct electrical signals proportional to the detected light intensity from the respective areas, said means for detecting comprising first detection means and second detection means each operative to sense two neighboring discrete stored image areas of a respective image and provide a respective set of distince electrical signals, said first detection means being arranged to sense light from neighboring discrete stored image areas spatially displaced along one axis of the respective image and said second detection means being arranged to sense light from neighboring discrete stored image area spatially displaced along an axis of the respective image that is orthogonally related to said one axis;

(b) means coupled to said means for simultaneously and sequentially detecting operative in response to said distinct electrical signals for deriving an output signal that is a function of the combined photometric characteristics of said stored image areas, said means operative comprising means for deriving a first density slope between the image areas observed by said first detection means, means for deriving a second density slope between the image areas observed by said second detection means, and means for deriving the square root of the sum-of-the-squares of said first density slope and said second density slope whereby when said respective image comprises a respective duplicate image, a density gradient in orthogonally-related directions is obtained; and (c) means to scan said photostorage materials for deriving a sequence of said output signals through detecting successive pluralities of stored image areas.

5. Optical apparatus according to claim 3 in which said means for detecting is a single means, light from said discrete stored image areas is separated by masking means and said electrical signals are made distinct by chopping means which alternately blocks light from said image areas so as to separate said electrical signals in time.

6. Optical apparatus according to claim 4 in which said means to scan comprises means to synchronously scan each said respective image so that said output signal varies in proportion to the density gradient across said image.

References Cited

UNITED STATES PATENTS

| | | | |
|---|---|---|---|
| 2,450,319 | 9/1948 | Weisglass | 356—223 |
| 2,469,935 | 5/1949 | Sweet | 356—203 X |
| 2,478,406 | 8/1949 | Lamb | 356—202 |
| 2,528,924 | 11/1950 | Vassy | 356—205 |
| 2,626,989 | 1/1953 | Brown | 356—203 X |
| 2,834,247 | 5/1958 | Pickels. | |
| 3,053,181 | 9/1962 | Jorgensen | 356—209 X |
| 3,244,062 | 4/1966 | Sweet | 356—203 |
| 3,246,334 | 4/1966 | Devereaux. | |
| 3,255,355 | 6/1966 | Frenk et al. | 356—205 X |
| 3,270,348 | 8/1966 | Lesage et al. | 356—205 X |

RONALD L. WIBERT, Primary Examiner

W. A. SKLAR, Assistant Examiner

U.S. Cl. X.R.

250—219, 220; 356—205, 206, 223

PO-1050
(5/69)

UNITED STATES PATENT OFFICE
CERTIFICATE OF CORRECTION

Patent No. 3,520,624 Dated July 14, 1970

Inventor(s) Ronald H. Johnson et al

It is certified that error appears in the above-identified patent and that said Letters Patent are hereby corrected as shown below:

Column 6, line 56, after "operative" insert --in response--;

Column 7, line 57, delete "distinct" and substitute --said distinct--; and

Column 8, line 4, delete "area" and substitute --areas--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents